Figure 9:
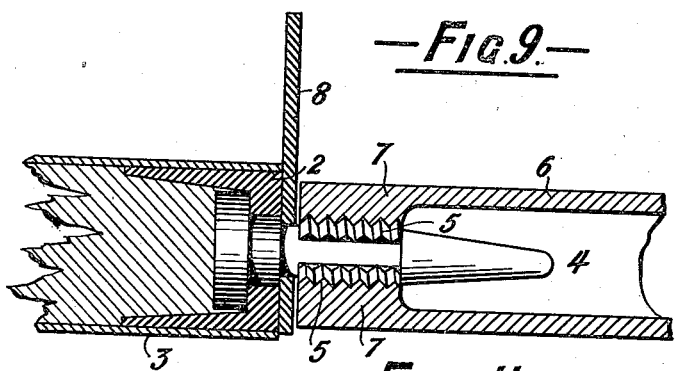

H. L., A. E. & H. O. SHORT.
AEROPLANE.
APPLICATION FILED AUG. 25, 1915.
1,167,943.
Patented Jan. 11, 1916.
2 SHEETS—SHEET 1.
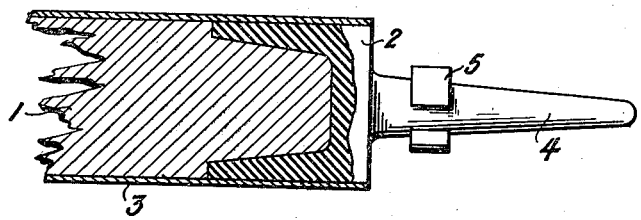
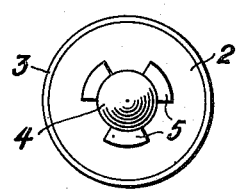
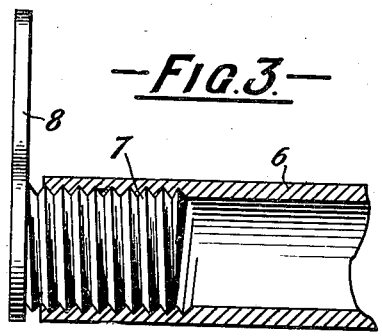
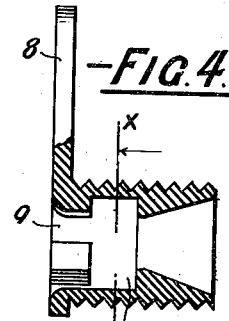
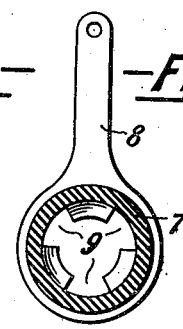
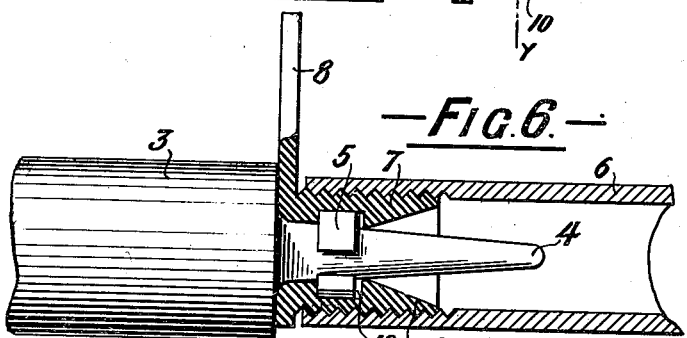
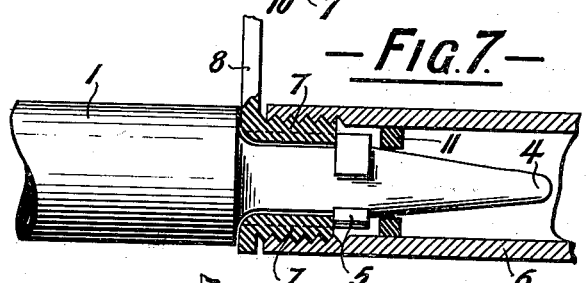
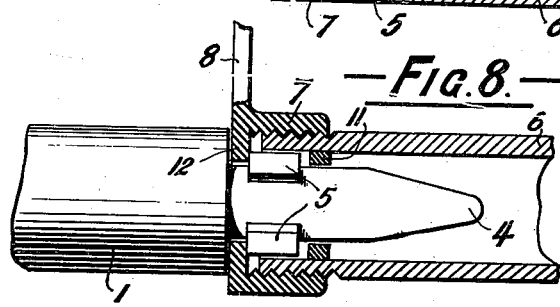
Inventors
Horace Leonard Short
Albert Eustace Short
Hugh Oswald Short
By
their Attorneys

H. L., A. E. & H. O. SHORT.
AEROPLANE.
APPLICATION FILED AUG. 25, 1915.

1,167,943.

Patented Jan. 11, 1916.
2 SHEETS—SHEET 2.

Inventors
Horace Leonard Short
Albert Eustace Short
Hugh Oswald Short
By Jessell & Son
their attorneys

UNITED STATES PATENT OFFICE.

HORACE L. SHORT, ALBERT EUSTACE SHORT, AND HUGH OSWALD SHORT, OF BATTERSEA PARK, LONDON, ENGLAND.

AEROPLANE.

1,167,943.     Specification of Letters Patent.     Patented Jan. 11, 1916.

Application filed August 25, 1915. Serial No. 47,382.

*To all whom it may concern:*

Be it known that we, HORACE LEONARD SHORT, ALBERT EUSTACE SHORT, and HUGH OSWALD SHORT, aeronautical engineers, subjects of the King of Great Britain, all residing at 56 Prince of Wales' Mansions, Queen's Road, Battersea Park, in the county of London, England, have invented certain new and useful Improvements in or Connected with Aeroplanes, and of which the following is a specification.

This invention relates to connecting the end of one spar to the end of another spar in aeroplane flying machines in which machines wing spars are divided and have to be detachably connected at such division, and the invention has particular reference to machines in which the wings are constructed so as to fold into a position approximately parallel with the fuselage of the machine, and in which one spar in each wing is formed with a hinge joint, while the other spar is made to separate and to be connected together at the junction as aforesaid.

The invention has for its object to provide ready means for connecting and disconnecting the sections of the spars, and in such a manner that although this is readily effected when desired, yet the portions when connected are held together more securely than when joining means which have required more complicated fitting have been hitherto employed.

According to this invention, the two portions of the spar to be united are respectively formed or fitted with a pin projecting from the end of one portion, and a socket on the end of the other portion, and the pin is formed with out-standing radial projections, separated from one another circumferentially, which radial projections are admitted through corresponding recesses cut radially in the socket, and which projections when passed within the socket, permit of secure attachment of one part with the other part when partial rotation is imparted either to the bolt or to the socket.

The shoulders of the projections are generally inclined, in order to tighten the junction of the parts by wedge action when they are moved relatively to each other in an angular direction about their axis.

The rotary motion is limited, and the parts are locked in the necessary relative positions by means of any locking device arranged exteriorly of the joint, in such a way that it may be readily seen whether or not the joint has been fastened, without requiring close inspection in order to ascertain this fact.

Examples of construction of the invention will now be described with reference to the accompanying drawings.

Figure 10:
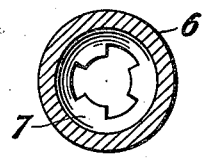
Figure 11:
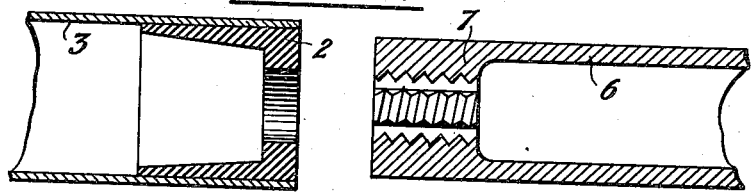
Figure 14:
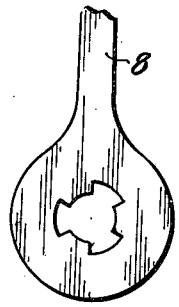
Figure 12:
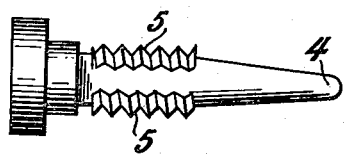
Figure 13:
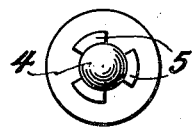
Figure 15:
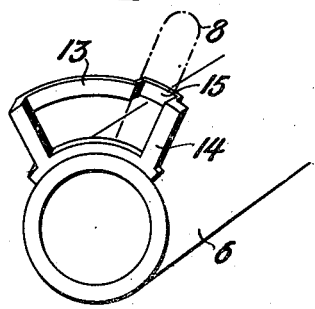
Figure 16:
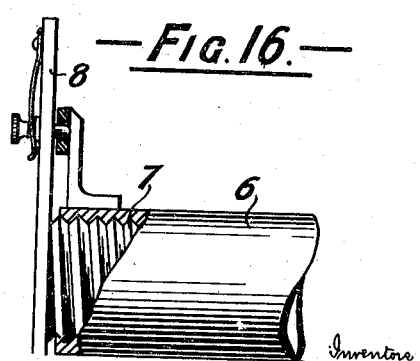

Figures 1 to 6 show a construction wherein the taper pin on one part of the structure has radial projections taking into recesses in the interior of an internal sleeve on the opposite part of the structure. Fig. 1 shows the end of the front spar of a wing in sectional elevation having the taper pin, and Fig. 2 is an end elevation of the same. Fig. 3 shows, in sectional elevation, one end of a front center spar having therein the locking sleeve to receive the taper pin of Fig. 1; Fig. 4 shows in vertical section the sleeve detached, and Fig. 5 is a transverse section on the line X—Y of Fig. 4. Fig. 6 shows the two parts of the structure brought together and secured. Fig. 7 shows, in vertical section, a construction where the projections on the taper pin pass entirely through the sleeve. Fig. 8 shows in sectional elevation, a construction where the sleeve engages the end of its member, such as the end of the front center spar, externally. Figs. 9 to 14 show a further modified construction of the invention, Fig. 9 being a sectional elevation showing the two parts of the structure engaged. Fig. 10 an end view of the sleeve or socket into which the taper pin passes. Fig. 11 shows the two adjacent parts of the structure with the taper pin removed. Figs. 12 and 13 are views showing the taper pin detached, and Fig. 14 is a detached face view of the lever employed for locking and unlocking the fastening. Fig. 15 shows a means for retaining the locking lever in position and controlling its motion, and Fig. 16 shows in sectional elevation, a modified construction of such lever-retaining means.

Referring to Figs. 1 to 6, the end of the spar of the wing, say the front spar 1, is fitted with a metal plug 2 having a metal extension 3 extending to a required distance along the length of the spar 1, and the end of the plug 2 is in this case formed with a tapered pin 4; the pin 4 has formed upon it a suitable number of segmental separated projections 5 at a short distance from the end face of the plug 2, clearly shown in the end view at Fig. 2. The opposite member 6, Fig. 3, which is one of the front center spars, is screw-threaded internally at its end to receive a sleeve 7 upon which is fixed an operating lever 8; the interior of the said sleeve 7, see Fig. 4, is formed with a central aperture to receive the tapered pin 4, and it also has radially cut recesses 9 to permit of the entry of the radial projections 5 of the pin, so that they may enter into an annular recess 10 in the interior of the sleeve 7, upon which a partial rotation of the sleeve 7, by means of the operating lever 8, will cause the locking of the tapered pin, and the lever 8 is then secured in position. It is preferable to make the bore of the sleeve 7 Fig. 4 on the right hand side of the annular recess 10 slightly smaller in diameter than the bore on the left hand side of the said recess 10 Fig. 4, so as to assist in guiding the pin 4 with the object of preventing injury to the edges of the inwardly extending radial parts at the entrance of the sleeve. The operating lever 8, which controls the movements of the sleeve 7, is limited as regards its angular motion and can be secured in position when the two parts are locked together by any suitable means or as hereafter described at the end of the specification.

Instead of forming the sleeve 7 with an annular recess for receiving the radial projections 5 of the tapered pin 4, the sleeve 7 may be slotted through from end to end as is shown at Fig. 7, and then the interior end face of the sleeve 7 may be used as the support for the faces of the segmental projections 5. In such a construction it is desirable to have a separate guide for guiding the tapered pin 4 into position and holding it firmly to prevent undesirable movement, and for this purpose a collar 11 is inserted in the tubular spar 6 in such a position as to act as a guide for the tapered pin.

In some cases the sleeve 7 may be made to embrace the hollow spar 6 as shown at Fig. 8 and be formed with a flange 12 in which the radially extending separated slots are cut extending from a central aperture for the passage of the projections 5 of the pin 4, which projections 5 then pass behind the flange 12 of the sleeve 7. Obviously the sleeve 7 might be fixed permanently or formed with the end of the spar 6, in which case the pin 4 with its projections would have to be so carried at the end of the spar 1 as to be capable of receiving angular movement about its axis. In some cases and as shown at Fig. 8, the pin 4 may be cylindrical for some part of its length, the cylindrical portion being slightly smaller than the bore of the collar 11 so as to assist in relieving the angularly extending parts in the flange 12 from abrasion or damage, and also to insure the concentric alinement of the pin 4. It will be clear also that where desired the sleeve 7 may be located on the spar box such as 2, 3 of the spar 1, and the pin 4 may be attached to the center spar 6. In all cases it has been found desirable that the part which receives angular adjustment should be rocked by means of an outstanding lever, or by some clearly visible means which indicates at a glance the position of the locking device.

Figs. 9 to 12 show a further construction in which the pin 4 is formed through a part of its length with an outstanding screw-thread which is cut away at distances apart in the direction of the axis of the pin, so as to leave segmental separated groups of threads 5, and the end of the spar 6 is formed or fitted at its end with an inward annular extension or sleeve 7, also screw-threaded in its interior and formed with longitudinal slots to permit of the free entry of the groups 5 of screwthreads of the pin 4 which can then be rigidly engaged with the screwthreads of the sleeve 7 by angular adjustment of the pin 4.

The pin 4 in the example now dealt with has a head and is passed through a boring in the end of the spar box or plug 2, and the operating lever 8, shown separately at Fig. 14, is so formed that it can be passed over the end of the pin 4 and secured in position on the pin by brazing or other convenient means, so as to provide a device by which the pin 4 can be angularly adjusted and its position indicated by ocular evidence. Instead of forming a single set of radial projections on the tapered pin such as the projections 5 of Fig. 1, several rows of such projections may be formed as will be well understood.

At Fig. 15 is indicated a device for limiting the motion of the operating lever and securing it in the locked position, such means consisting of a segment 13 fixed to one of the parts, so that the operating lever 8 is limited by the end members 14 of the segment, and the lever itself may be made sufficiently resilient to spring when locked into the recess 15 of the said segment 13. Instead of making the lever to spring into the segment, it will be well understood that any mechanical locking means may be adopted, as for instance is shown at Fig. 16 where the lever 8 is fitted with a suitable construction of spring bolt for engaging the segment.

What we claim as our invention and desire to secure by Letters Patent is:—

1. In an aeroplane flying machine in which wing spars are divided transversely of their length and detachably connected at such division; the combination of a pin projecting coaxially from the end of one spar section, said pin having outstanding projections separated from one another circumferentially, a socket on the adjacent end of the other spar section, said socket having a central bore to receive said pin and longitudinal recesses to permit of the entry of said outstanding projections on said pin, means for giving relative angular movement to said pin and socket about their common axis to cause the said projections on said pin to pass angularly beyond said recesses in said socket to lock the parts together, and means for limiting said relative angular movement and for securing the said parts in the locked position.

2. In an aeroplane flying machine in which wing spars are divided transversely of their length and detachably connected at such division: the combination of a pin projecting coaxially from the end of one spar section, said pin having outstanding projections separated from one another circumferentially, a tapered portion of said pin extending beyond said outstanding projections, a socket on the adjacent end of the other spar section, said socket having a central bore to receive said pin and longitudinal recesses to permit of the entry of said outstanding projections on said pin, means for giving relative angular movement to said pin and socket about their common axis to cause the said projections on said pin to pass angularly beyond said recesses in said socket to lock the parts together, and means for limiting said relative angular movement and for securing the said parts in the locked position.

3. In an aeroplane flying machine in which wing spars are divided transversely of their length and detachably connected at such division: the combination of a pin projecting coaxially from the end of one spar section, said pin having outstanding projections separated from one another circumferentially, a socket on the adjacent end of the other spar section, said socket having a central bore to receive said pin and longitudinal recesses to permit of the entry of said outstanding projections on said pin, means for giving angular movement to said socket about its axis to cause said projections on said pin to become located angularly beyond said recesses in said socket to lock the parts together, and means for limiting said angular movement and for securing the said parts in the locked position.

4. In an aeroplane flying machine in which wing spars are divided transversely of their length and detachably connected at such division; the combination of a pin projecting coaxially from the end of one spar section, said pin having outstanding projections separated from one another circumferentially and a tapered portion extending beyond said outstanding projections, a socket on the adjacent end of the other spar section, means for securing said socket to said spar section to permit said socket to have angular adjustment about its axis relatively thereto, said socket having a central bore and longitudinal recesses to permit of the entry of said pin and of said outstanding projections on said pin, a radially extending arm on said socket for giving angular adjustment thereto to cause said projections on said pin to become located angularly beyond said recesses in said socket to lock the parts together, and means for limiting said angular movement and for securing the said parts in the locked position.

5. In an aeroplane flying machine in which wing spars are divided transversely of their length and detachably connected at such division; the combination of a pin projecting coaxially from the end of one spar section, said pin having outstanding projections separated from one another circumferentially, the faces of said projections facing the end of the spar section being inclined, a tapered portion of the pin extending beyond said outstanding projections, a socket on the adjacent end of the other spar section, means for securing said socket to said spar section to permit said socket to have angular adjustment about its axis relatively thereto, said socket having a central bore and longitudinal recesses to permit of the entry of said pin and of said outstanding projections on said pin, a radially extending arm on said socket for giving angular adjustment thereto to cause said projections on said pin to become located angularly beyond said recesses in said socket to lock the parts together, said inclined faces of said projections coacting with surfaces on said socket to draw said pin into said socket, and means for limiting said angular movement for securing the said parts in the locked position.

6. In an aeroplane flying machine in which wing spars are divided transversely of their length and detachably connected at such division: the combination of a pin projecting coaxially from the end of one spar section, said pin having outstanding projections separated from one another circumferentially and located at a distance from the end of the spar section carrying said pin, a socket on the adjacent end of the other spar section, said socket having a central bore and longitudinal recesses to permit of the entry of said outstanding projections on said pin, said bore having said recesses corresponding in length longitudinally to the distance between the end of the pin-carrying spar and the projections on the said pin to permit said projections on said pin passing beyond said recesses, means for giving relative angular movement to said pin and socket about their common axis to cause the said projections on said pin to pass angularly beyond said recesses in said socket to lock the parts together, and means for limiting said relative angular movement and for securing the said parts in the locked position.

7. In an aeroplane flying machine in which wing spars are divided transversely of their length and detachably connected at such division: the combination of a pin projecting coaxially from the end of one spar section, said pin having outstanding projections separated from one another circumferentially and located at a distance from the end of the spar section carrying said pin, an extension of said pin of tapered configuration projecting beyond said outstanding projections thereon, a socket on the adjacent end of the other spar section, said socket having a central bore and longitudinal recesses to permit of the entry of said pin and of said outstanding projections on said pin, said bore having said recesses corresponding in length longitudinally to the distance between the end of the pin-carrying spar and the projections on said pin to permit said projections on said pin passing beyond said recesses, said socket having a space at its rear beyond said recesses to permit of the angular movement of said projections on said pin, and a guiding collar carried by said spar having said socket, said guiding collar being located beyond said projections on said pin to receive and guide the tapered end of said pin, means for giving relative angular movement to said pin and socket about their common axis to cause said projections on said pin to pass angularly beyond said recesses in said socket to lock the parts together, and means for limiting said relative angular movement and for securing the said parts in the locked position.

In witness whereof we have hereunto set our hands in the presence of two witnesses.

HORACE L. SHORT.
ALBERT EUSTACE SHORT.
HUGH OSWALD SHORT.

Witnesses:
HENRY TOWNSEND COPLAND,
WALTER FAGAN.